Feb. 1, 1966     O. GUNKEL     3,232,219
FRUIT PRESS
Filed Aug. 5, 1963     3 Sheets-Sheet 2
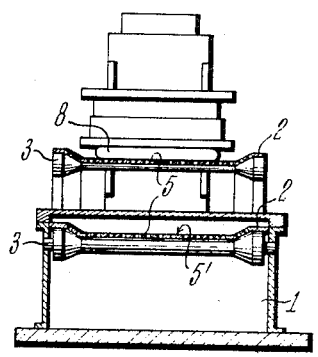
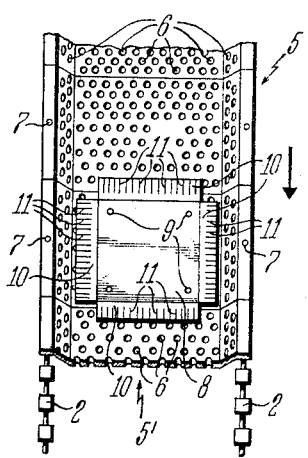
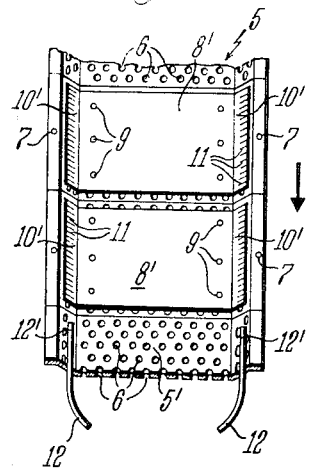
INVENTOR
OTTO GUNKEL
BY Dicke and Craig
ATTORNEYS Feb. 1, 1966     O. GUNKEL     3,232,219
FRUIT PRESS
Filed Aug. 5, 1963     3 Sheets-Sheet 3
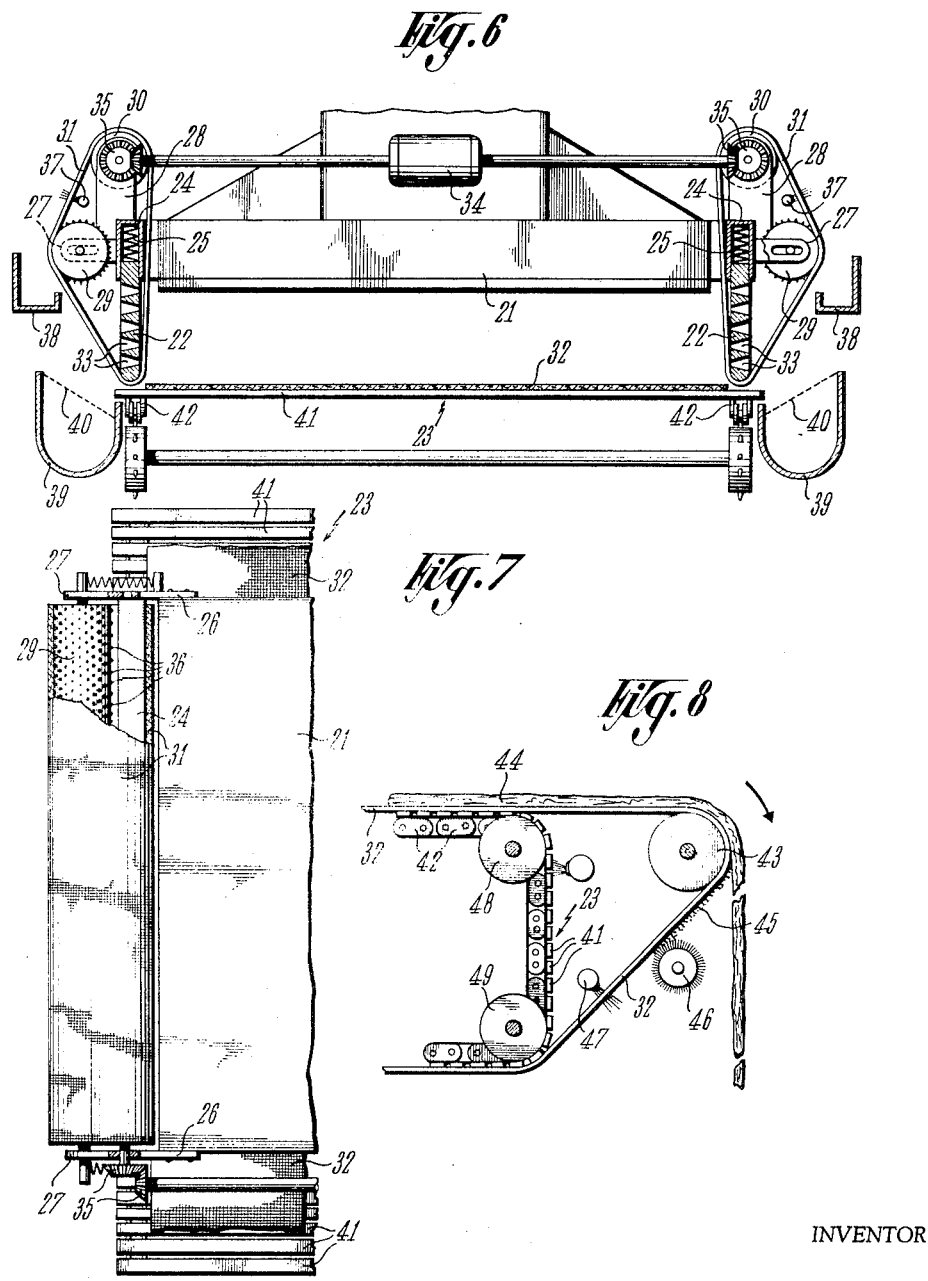
INVENTOR
OTTO GUNKEL
BY Dicke & Craig
ATTORNEYS 3,232,219
FRUIT PRESS
Otto Gunkel, Dammstrasse 72,
Heilbronn (Neckar), Germany
Filed Aug. 5, 1963, Ser. No. 299,830
31 Claims. (Cl. 100—120)

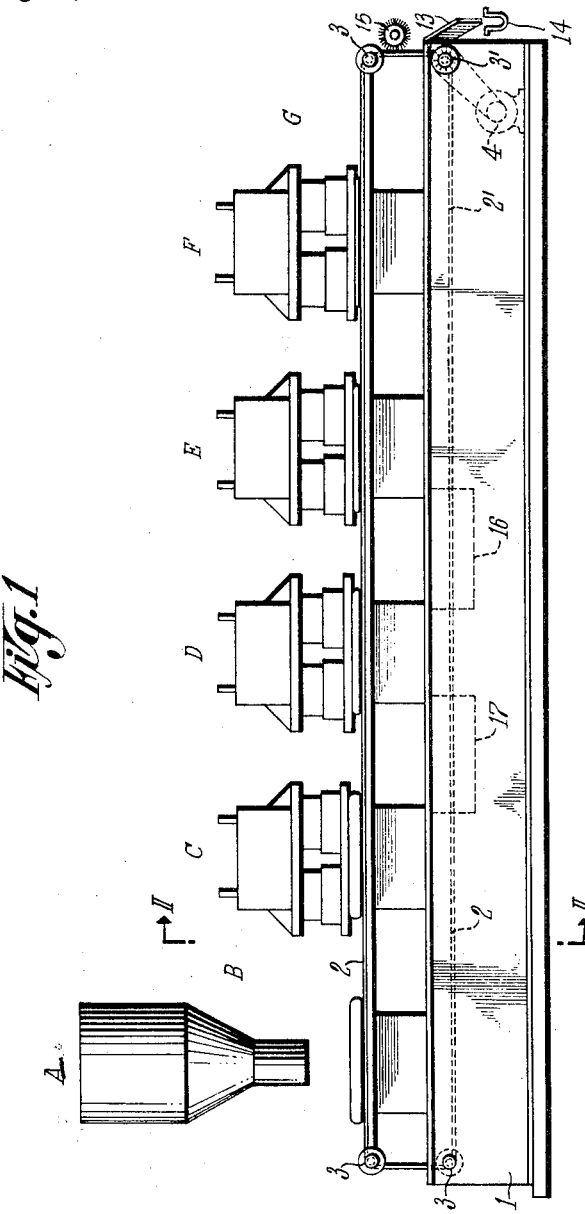
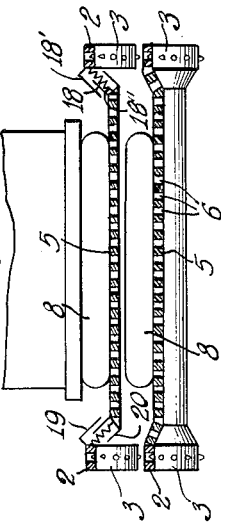

The invention relates to a fruit press and has for its object to provide a fruit press which operates continuously, and, moreover, is of comparatively simple construction. It is difficult to design a continuous fruit press because the fruit residues or "draff," from apples or pears for example, is extremely absorbent so that this draff if manipulated in a continuous process, immediately sucks up practically all the fruit juice adjacent to it, beyond the point at which it is pressed. For these reasons attempts have been made to press fruit products by means of pairs of rollers arranged successively, but these methods have not given a satisfactory result.

On the other hand the invention resides in the provision of several pressing stages and a conveyor device which feeds the compacted mass of material to be pressed stepwise successively under individual presser stages, and beneath the conveyor device means is provided at least in the region of the pressing stages means for leading away the juice.

With the press according to the invention the presser plungers of the presser units remain for a predetermined period in contact with the pulp mass so that the juice can flow out of the region of the pulp mass during this pressing period to an extent such that on releasing the pressure and on expansion of the draff after one pressing stage the juice can no longer be sucked up by the draff. Thereby there is obtained not only a high working efficiency and continuous and automatic operation, but it is also possible to collect the juice separately from the individual pressing stages since, for example, the quality of the juice expressed at the first pressing stage is the best. Because the several pressing stages follow one another, the pressing times in the individual stages are comparatively small. Moreover, it has been found that if the draff can expand again between the individual pressing stages the individual ducts through which the juice flows out of the draff and which are blocked during pressing to an increasing extent by portions of the draff and by albumenoids, become free again as a result of this "breathing" of the compressed mass. In any case experiments have shown that if pressing is effected twice successively, in some cases with varying compression pressures, the amount of juice obtained in unit time is greater than if the pressing is unbroken.

The invention has special advantages as compared with known packing presses in which thirty or forty layers of fruit mash are inserted into press cloths and separated one from the other by freely inserted grids, since this requires the use of large presses which effect extraction from the whole mass of material in one pressing operation. Moreover, these large pack presses operate neither continuously nor automatically. Also, it is of particular advantage that with the press according to the invention there is in each case only one of the pulp masses subjected to one pressing stage since the pressing time for pressing a definite amount of pulp is, for a given amount, shorter than half the pressing time of twice the amount of pulp. This depends on the fact that the ratio of volume to outer surface of the mass of material is always less favourable with increasing amounts of pulp.

The individual pressing stages can be operated either with constant pressures or with varying pressures, but preferably the pressure increases in the individual stages in the direction of movement of the material.

In the invention the conveyor device performs a particularly important function of moving the individual masses of material from one press station to the other. Various conveyor devices may be used for this purpose, but a conveyor belt moving over a pressing table is particularly advantageous, the grid bars of which consist of a stainless material such as V2A steel, and in which presser cloths are mounted on these bars, the edges of which are movable for wrapping the pressed material. These edges of the cloths can be stiffened by means of rods. If, therefore, a definite amount of pulp is applied through a filling opening on to the opened out cloth, the free movable edges of the pressing cloth are placed over the pulp either by hand or by mechanical devices. For this purpose the stiffening of the edges of the cloth may be provided by rods. The press can be so constructed that the individual presser plungers are arranged directly beside one another. In this case the presser cloths are wrapped only laterally over the mass of pulp laid on the belt and a continuous layer of pulp material is laid on to the belt. This arrangement is convenient since sufficient juice can flow downwardly through the grid plates since one is not concerned with the fact that the juice has to be led away not only at the side edges, but also at the front and rear ends of the block of press material which lie at the front and the rear in the direction of movement. The individual pressing stages can, however, be carried out in a somewhat different manner in which individual masses of material travel on the conveyor belt at spaced positions one from the other through the machine.

The grid plates can be arranged in various ways and may be coupled to form a conveyor belt. Preferably they are fastened at their side edges to conveyor chains whereby preferably these side edges are raised at their connection points with the conveyor chains in order that these connecting points shall not come into contact with the juice.

At the entry to the machine, a distributor device can be provided for laying a definite amount of fruit on to the grids.

The automatic devices for wrapping the edges of the press cloths over the fruit laid on the grid can be formed in various ways. For example, guides may be provided which lift and lower the edges of the press cloths embodying stiffening members, preferably perpendicularly to the edge, during the movement of the conveyor belt. In this case it should be noted that the strengthening or stiffening of the edges of the press cloth should only extend inwardly so far that between the surface of the cloth resting on the grid and the stiffened edges sufficient unstiffened material should remain in order that this flexible part of the cloth can be carried over on to the side edges of the pressed mass and thus permit the stiffened parts of the cloth to lie flat upon the mass of material. While the edges of the cloth facing the side edges of the belt can be laid down by stationary guides during the forward movement of the belt, it is convenient for the front and rear ends of the cloth seen in the direction or movement to be laid over by mechanically moved devices, or conveniently suitable gripper devices. The same applies to those devices which again release the folded over ends of the cloth after traversing the pressing stages so as to release the pressed product and to permit removal of the draff.

In another very convenient construction, bars are fitted to the longitudinal edges of the press plunger at least of the first pressing stage for laterally confining the material to be pressed on the conveyor belt, and which extends in the lowermost position of the plunger as far as the conveyor belt. The application of these confining bars makes it unnecessary to provide for folding over the edges of the press cloths. This arrangement leads obviously to a narrower construction of the machine and also to a reduced length, since on the one hand the edges of the press cloths which stand outwardly when opened out do not have to be allowed for, and on the other hand the provision of devices for folding over these edges, and resulting in a substantial increase in the length of the machine, are no longer needed. Furthermore, it is of advantage that the press cloths need no longer be fastened on the conveyor belt, but in accordance with a further feature of the invention the press cloth can be formed as an endless belt which rests freely on the conveyor belt. The conveyor belt itself is then conveniently formed as a screening belt consisting of a row of cross rods arranged in spaced order and connected at their ends to chain links. By this construction of the press cloth as an endless and freely supported belt the result is secured that the press cloth can be lifted from the conveyor belt beyond the pressing stations and the space between the press cloth and the conveyor belt can be cleaned.

The confining bars can, moreover, be fitted also to the presser plunger of further stages if this is required by the material being pressed. In order to secure a satisfactory flow of the expressed juice the confining bars are preferably perforated or slotted and a cloth is stretched over them. This cloth is conveniently arranged as an endless belt around the upper and lower edges of the bars. Such a construction of the cloth makes it possible to move the cloth onward stepwise after each stroke of the press. The amount of feed is so proportioned that it is approximately the same as the layer height of the material being pressed. It is then possible to clean the cloth stretched over the bars so that at each pressing operation the bars are covered by a cleaned part of the cloth. Thus the belt can, for example, be guided over preferably spring-mounted rollers, one of which is driven and the other is provided with blunt projections, dimples or the like to assist removal of residues. Moreover, means may be provided for assisting removal of such residues by means of compressed air at a point adjacent to said roller.

Beyond the final pressing stage there is provided in one embodiment of the invention a deflector or reverser roller for the belt so that the draff falls out of the press cloths. Beyond this station a stripping device may be provided in one embodiment of the invention which conveniently consists of a rotating brush roller or other means for removing the draff from the press cloths.

Finally, the conveyor belt may be moved past a washing device and then through a drying device and in the latter the press cloths and the conveyor belt are dried, preferably by means of compressed air or by warm air currents.

Standard types of pressing units may be used in the pressing stages, for example hydraulic units, pneumatic units or any other suitable mechanical pressing devices.

Further features of the invention will be apparent from the following description of one constructional form thereof in conjunction with the claims and the accompanying drawing. The individual features can be used on their own, or several of them may be combined in one embodiment of the invention.

One embodiment of the invention is shown in the drawing in which:

FIG. 1 shows diagrammatically a side view of a machine according to the invention, FIG. 2 is a section on the line II—II in FIG. 1, FIG. 3 is a plan of the section of the conveyor belt in the embodiment shown in FIG. 1, FIG. 4 shows a portion of a plan of the conveyor belt in an embodiment of the invention in which the individual presser stages are arranged immediately adjacent one to the other, FIG. 5 shows another embodiment of the invention in which two conveyor belts are provided arranged one over the other, FIG. 6 shows a view of a presser plunger in the direction of the conveyor belt and a section through the upper run of the conveyor belt in accordance with a further construction of machine according to the invention, FIG. 7 shows a plan of part of the device of FIG. 6, and FIG. 8 shows on a reduced scale a side view of the conveyor belt of the machine of FIG. 6 in the region of the end of the machine.

In the embodiment shown in FIGS. 1 to 5, two link chains 2 are arranged parallel one to the other on a machine frame 1 and are supported by suitable guide wheels 3, 3'. The guide wheel 3' may conveniently be formed of a sprocket wheel and driven by a motor 4. Grids or gratings 5 of stainless material such as V2A steel are fastened to the chains which are additionally guided between the guide wheels 3, 3' over suitable support rollers, the grids or gratings 5 being provided with holes 6 through which the expressed juice flows into a collecting vessel or vessels, not shown. The grids or gratings are of bent form, the edges which are fastened by rivets, screws or otherwise 7 to the chain links 2 are thus raised above the centre part 5' in order that the outflowing juice shall not come into contact with the chain links and their support means.

Press cloths 8, 8' are fastened on the individual grids or gratings 5 by means of screws, rivets or the like 9. The press cloths are, however, only fastened at their centre parts on the grids or gratings 5. The edge parts 10 are in the form of flaps. In the embodiment of the invention shown in FIG. 3 the centre part of the press cloth 8 connected to the grid or grating 5 is provided in all four directions with projecting flaps 10. The edges of the flaps are stiffened by stiffening rods 11 running perpendicular to the edge.

The embodiment shown in FIG. 4 differs from the embodiment of FIG. 3 only in the fact that lateral flaps 10' only are provided, no flaps being provided at the front and rear as seen in the direction of movement of the conveyor belt. In this case of the embodiment of FIG. 4, press cloths 8' are fastened to each grid plate 5 which are arranged directly one after the other, whereas in the embodiment of FIG. 3 the individual press cloths 8 are fastened to the conveyor belt in spaced order so that not every grid 5 carries a press cloth 8.

In the embodiment shown in FIG. 1 the conveyor belt such as shown in FIG. 3 or 4, is fed stepwise through several stations A to G. At the station A a predetermined amount of fruit or pulp is placed on the conveyor belt. This can be effected by known arrangements including weighing devices or tilting containers. At the station B suitable devices place the side flaps 10 over the pulp material. These devices can be arranged in various ways. If the side flaps 10' of the press cloths 8, 8' are raised in advance of the station A by means of guides 12, indicated in FIG. 4, and held in this position by suitable guides, it is only necessary in this embodiment of FIG. 4 to provide a guide at the station B which folds the side flaps 10' inwardly over the pulp material. In this case the proportions may be such that the side flaps 10' bear against the bent side walls 5" so that a small hollow space is formed between the lower side of the flaps 10' stiffened by the rods 11 and the grid 5 which is bent at this point, in which the forward ends 12' of the guides may easily enter.

If a conveyor belt is used in the embodiment according to FIG. 3, the devices for folding the flaps 10 must be of a somewhat more complicated construction in order that the front and rear flaps 10 as seen in the direction of movement of the belt, can be reliably engaged and folded over the material to be pressed.

From the station B in which the pulp material is packed into the cloths the conveyor belt passes below the first presser stage C which in the embodiment of the invention shown embodies a hydraulically or pneumatically operated plunger. The pressing period may, for example, be one minute at 30 kg. per sq. cm. From the station C the pressed product is led at the next feed movement of the belt to the pressing station D in which the pressed product is subjected to a somewhat higher pressure than at station C. At the following working stage the pressed material moves to the station E and then in turn to the station F. The pressure operative at the stations E and F may be the same or different and may be the same as, or may be larger than the pressure at the stations C and D. At the station G guides or other devices are provided which lift the flaps 10 and 10' so that the draff falls away from the press cloths 8 on deflection of the conveyor belt 3 and falls over a chute 13 to a conveyor belt 14 which carries off the draff. A brush roller 15 is provided above the chute 13 which brushes off the draff from the cloth.

The station G, at which the devices for opening the flaps 10 and 10' are arranged, can also be omitted if the flaps 10 and 10' are made so heavy that they move downwardly naturally on the lower run 2' of the conveyor belt. Alternatively, the station G can be shifted to the lower run so that the opening of the flaps 10 is effected with the assistance of gravity. Also the brush roller 15 may be arranged to operate in the lower run of the conveyor belt. In this case the conveyor belt 14 runs through the machine housing 1 parallel to the lower run.

On the lower run a washing vessel 16 is provided in which the cloth and the grid are cleaned by water and by brushing. Then the conveyor belt passes through the drying chamber 17 in which the plate sections and the press cloths fastened to them are dried in compressed air, preferably a hot air current. Then the conveyor belt sections again move to the station A where they are again loaded.

If a conveyor belt is used in the arrangement shown in FIG. 3 the pressing stages C to F are arranged at a distance one from the other as is shown in FIG. 1 for example. If, however, a conveyor belt is used as shown in FIG. 4 the pressing stages C to F are placed immediately adjacent one to the other.

The individual pressing stations C to F may each have a separate juice off-take so that fruit juices of different qualities can be obtained. It is convenient to guide the conveyor belt in the region of the pressing stages over a press table so that the lateral mountings of the grids in the region of the chain links 2 are not stressed during pressing.

In another embodiment shown in FIG. 5, the conveyor device may also embody two or more conveyor belts arranged one over the other on which the plate grids 5 and, as already described, the press cloths for the material to be pressed, are fastened. According to one feature of the invention the conveyor belts lying above the first conveyor belt are spring-mounted in the direction of the compression pressure. These conveyor belts may be inherently springy or they may be provided with special springs 18 which are arranged in telescopic manner as shown in the drawings, or in other ways.

One advantage of this construction of the invention lies in the fact that two or more quantities of pulp can be simultaneously pressed so that the yield of the plant is increased. The springs 18 can be so arranged that one end 18' is fastened on the chain link 2, and the other end 18" to the true grid 5. The springs 18 are surrounded by sleeves 19 and 20 which protect the springs from soiling.

In another embodiment of the invention the individual stations A to G as well as the motor 4 can be controlled by a known hydraulic drive system.

In the embodiment according to FIGS. 6 to 8, bars 22 are fastened to the longitudinal edges of the presser plunger 21, which serve for laterally confining the material supported on the conveyor belt 23 to be subjected to pressure. The confining bars 22 are so proportioned that in the lowermost position of the plunger 21 they just reach the conveyor belt 23. In order to avoid any damage which could be caused by a preliminary engagement of the bars, the later are displaceably mounted in boxes 24 and rest against springs 25 fitted therein. The boxes 25 are fastened by means of lugs 26 to the transverse surfaces of the plunger 21. These lugs 26 are provided with projections 27, 28 which serve for supporting guide rollers 29, 30 over which an endless cloth belt 31 is placed, which also surrounds the lower edge of the corresponding bar 22. The belts 31 serve, in the same way as the press cloth 32 on the conveyor belt 23, to avoid blockage of the slots 33 between the bars 22 and thus permit satisfactory flow-off of the expressed juice while hindering the flow of draff.

In order that the belts 31 surrounding the bars 22 can be kept clean, the upper rollers 30 are driven by means of a motor 34 mounted on the plunger 21, and a level gear drive 35 in such manner that after each stroke of the plunger 21 they move stepwise by an amount which is approximately equal to the height of the press material supplied to the conveyor belt 23. Thus, on each pressing operation another section of the cloth is brought to lie against the sides of the bars 22 facing the material being pressed. The rest of the belt can be meanwhile subjected to a cleaning operation. For this purpose in the machine shown, the roller 29 is provided with rounded projections or dimples 36 which penetrate into the cloth of the belt 31 and thus remove adhering draff. This is particularly advantageous when pressing berry fruits. Furthermore, a pipe 37 with air nozzles is provided in order to blow off any still adhering draff. The ejected draff materials are collected in the trough 38 which ensures that these residues do not pass into the juice channels 39, the latter being furthermore protected by means of a cover screen 40.

By reason of the confining bars 22 lateral control of the material to be pressed beneath the press plunger 21 is obtained which makes it unnecessary to provide for the edge wrapping by means of the press cloth 32 in the previous embodiments. It is sufficient if this, as shown in FIG. 6 extends as far as the confining bars 22. The omission of the edge wrapping permits fastening of the press cloth 32 on the conveyor belt 23 to be avoided. The press cloth can thus be formed as an endless belt, just like the conveyor belt, and is guided over rollers and rests freely on the conveyor belt 23 in the region of the pressing stages. This has the advantage that the press cloth can be changed without difficulty independently of the conveyor belt. It is particularly advantageous, however, if the press cloth 32 can have a greater length than the conveyor belt 23 and, thus, as shown in FIG. 8, can be moved away from the conveyor belt 23 at the far end of the machine for example. This permits the conveyor belt 23, which is guided over rollers 48, 49, to be washed by means of a a spray device 50. The conveyor belt 23 can be constructed conveniently and in a simple way as a grating belt having cross rods 41 arranged in spaced order one from the other and fastened at their ends to the link chain 42.

The longer press cloth 32 is carried onward in the direction of the upper run of the conveyor belt and guided over the roller 43. The draff 44 on the press cloth 32 breaks off after deflection of the press cloth 32 over the roller 43 and falls off the belt in the downward direction. Still adhering draff 45 can then be removed by means of a rotating brush 46. As a further cleaning means a pipe 47 with air nozzles is shown in FIG. 8 which serves to blow off final draff residues.

It should be understood that the invention is not limited to the constructional examples shown. In particular in the constructional example of FIGS. 7 and 8 use may be made of hydraulic or pneumatic means for pressing the confining bars and/or for driving the belt surrounding the bars. Furthermore, the conveyor belt may be constructed in other ways, and the press cloth may be lifted from the conveyor belt at other points.

What I claim is:

1. A fruit press comprising at least one pressing means, conveyor means for feeding portions of the material to be squeezed to said pressing means including a conveyor belt having grating surfaces and press cloths fastened to said surfaces so that the edges of the cloths are free for folding over the material to be pressed, a plurality of pressing means, and means for driving said conveyor belt stepwise successsively so as to position said material to be squeezed beneath successive pressing means.

2. A fruit press according to claim 1 in which means are provided for automatically folding the edges of the cloths over the mass of material to be pressed and delivered on to the press cloth.

3. A fruit press according to claim 2, in which said folding means includes guides provided for erecting and folding over the edges of the press cloth.

4. A fruit press according to claim 1 in which the edges of the press cloths are strengthened by means of a plurality of rods.

5. A fruit press according to claim 1 in which said grating surfaces are fastened at their sides to conveyor chains.

6. A fruit press according to claim 5 in which the side edges of the grating surfaces are raised at their edges connected to the conveyor chains.

7. A fruit press according to claim 1, in which the grating surfaces consist of stainless steel plates provided with apertures and to the centre of which the press cloths are fastened.

8. In a fruit press having two or more pressing stages, conveyor means for feeding portions of the material to be pressed stepwise through the individual pressing stages, press means for the material located at each of said pressing stages and providing different compression pressures at each stage, and juice discharge means associated with each press means, said conveyor means comprising a pair of conveying chains, grating trays fastened at opposite sides to said conveying chains, press cloths fastened to said grating trays so as to provide movable lateral borders for wrapping up the borders to be squeezed out, and guide means for folding the lateral borders over the material to be squeezed prior to reaching the first pressing stage.

9. A fruit press according to claim 8, in which one working stage of the machine includes a supply device for delivering definite amounts of fruit onto the press cloth.

10. A fruit press according to claim 8, in which a stripper device is provided beyond the final pressing stage for stripping off the draff residues adhering to the belt after deflection of the latter into a different path.

11. A fruit press according to claim 10 in which the stripper device consists of and includes a rotating brush roller.

12. A fruit press according to claim 8, in which the conveyor belt is guided past a washing device beyond the final pressing stage.

13. A fruit press according to claim 12, in which the conveyor belt is led through a drying device beyond the washing device.

14. A fruit press according to claim 13, in which the drying device embodies air delivery nozzles directed towards the belt.

15. A fruit press comprising a plurality of pressing means for exerting different compression pressures on a material to be squeezed, conveyor means for feeding portions of the material to be squeezed stepwise successively beneath successive pressing means, juice discharge means positioned beneath said conveyor means at least in the region of each pressing means, said conveyor means including a conveyor belt having grating surfaces and press cloths fastened to said surfaces so that the edges of the cloths are free for folding over the material to be pressed.

16. A fruit press according to claim 15, in which said pressing means includes a vertically movable presser plunger provided at each presser stage, and press tables at the pressing positions for supporting said grating surfaces.

17. A fruit press according to claim 16, in which means are provided for automatically cleaning and opening up the edges of the press cloths beyond the final pressing stage.

18. A fruit press according to claim 15 in which the conveyor device embodies two or more conveyor belts arranged one over the other and to which the grid plates or gratings and the press cloths are fastened for the material to be pressed.

19. A fruit press according to claim 18, in which the second conveyor belt disposed above the first said conveyor belt is yieldably mounted in the direction of the pressing operation.

20. A fruit press according to claim 19, in which the grid plates and the upper conveyor belt or belts are connected by springs to the conveyor chains carrying them.

21. A fruit press according to claim 15, in which bars are provided at the longitudinal edges of the presser plunger at least for the first pressing stage, for laterally confining the material to be pressed on the conveyor belt, and which extends up to the conveyor belt in the lowermost position of the plunger.

22. A fruit press according to claim 21, in which the confining bars are provided with apertures or slots and a cloth belt is stretched over them.

23. A fruit press according to claim 22, in which the cloth is guided in the form of an endless belt over the upper and lower edges of the confining bars.

24. A fruit press according to claim 23, in which the cloth is fed onward stepwise after each stroke of the plunger, and the amount of movement is approximately equal to the layer height of the material being pressed.

25. A fruit press according to claim 24, in which the belt is guided over preferably spring mounted rollers, one of which is positively driven.

26. A fruit press according to claim 25, in which one roller is provided with rounded projections, dimples or the like to assist removal of draff residues.

27. A fruit press according to claim 26, in which means are provided adjacent the said roller for blowing off solid residues by means of compressed air.

28. A fruit press according to claim 21, in which the confining bars are spring-mounted in the direction of movement of the plunger.

29. A fruit press according to claim 21, in which the conveyor belt consists of a row of mutually spaced cross-rods which are connected at their ends to the links of a chain.

30. A fruit press according to claim 29, in which the conveyor belt is provided with an endless cloth and rests freely on the conveyor belt.

31. A fruit press according to claim 30, in which the press cloth has a greater length than the conveyor belt and moves away from the conveyor belt after traversing the pressing stages.

References Cited by the Examiner
UNITED STATES PATENTS

| | | | |
|---|---|---|---|
| 146,338 | 1/1874 | Herreshoff | 100—120 X |
| 187,312 | 2/1877 | Quinn | 100—122 X |
| 255,896 | 4/1882 | Stevens | 100—122 X |
| 602,620 | 4/1898 | Flory | 100—118 |

(Other references on following page)

| | | UNITED STATES PATENTS | | | | FOREIGN PATENTS | |
|---|---|---|---|---|---|---|---|
| 1,531,876 | 3/1925 | Reesor et al. | 100—120 | 217,462 | 9/1958 | Australia. | |
| 1,991,760 | 2/1935 | McEver et al. | 100—152 | 512,312 | 11/1930 | Germany. | |
| 2,289,753 | 7/1942 | Capstaff | 15—306.1 | | | | |
| 2,966,112 | 12/1960 | Guettler | 100—153 XR | | | | |

WALTER A. SCHEEL, *Primary Examiner.*